US011320075B2

(12) United States Patent
Zhou et al.

(10) Patent No.: US 11,320,075 B2
(45) Date of Patent: May 3, 2022

(54) QUICK-CONNECTION DEVICE HAVING DOUBLE LOCKING MECHANISM

(71) Applicant: A. RAYMOND ET CIE, Grenoble (FR)

(72) Inventors: Yingjun Zhou, Zhenjiang (CN); Feng Que, Zhenjiang (CN); Zhen Chen, Zhenjiang (CN)

(73) Assignee: A. RAYMOND ET CIE, Grenoble (FR)

( * ) Notice: Subject to any disclaimer, the term of this patent is extended or adjusted under 35 U.S.C. 154(b) by 670 days.

(21) Appl. No.: 16/113,669

(22) Filed: Aug. 27, 2018

(65) Prior Publication Data

US 2019/0271427 A1    Sep. 5, 2019

(30) Foreign Application Priority Data

Mar. 2, 2018   (CN) .......................... 201810174093.8

(51) Int. Cl.
*F16L 37/12*    (2006.01)
*F16L 21/08*    (2006.01)

(52) U.S. Cl.
CPC ........... *F16L 37/1225* (2013.01); *F16L 21/08* (2013.01)

(58) Field of Classification Search
CPC .... F16L 37/1225; F16L 37/0841; F16L 21/08
USPC .................................. 285/321, 93, 305, 317
See application file for complete search history.

(56) References Cited

U.S. PATENT DOCUMENTS

| 5,586,792 | A  | * | 12/1996 | Kalahasthy | ........... | F16L 37/098 |
|           |    |   |         |            |            | 285/319 |
| 5,863,077 | A  | * | 1/1999  | Szabo      | .................... | F16L 37/144 |
|           |    |   |         |            |            | 285/3 |
| 6,089,616 | A  | * | 7/2000  | Trede      | .................. | F16L 37/0841 |
|           |    |   |         |            |            | 285/93 |
| 6,328,344 | B1 | * | 12/2001 | Tozaki     | ................ | F16L 37/0985 |
|           |    |   |         |            |            | 285/120.1 |
| 7,044,505 | B2 | * | 5/2006  | Takayanagi | ......... | F16L 37/0987 |
|           |    |   |         |            |            | 285/319 |
| 7,677,608 | B2 | * | 3/2010  | Takayanagi | ........... | F16L 37/144 |
|           |    |   |         |            |            | 285/319 |
| 8,240,716 | B2 | * | 8/2012  | Kerin      | .................... | F16L 37/144 |
|           |    |   |         |            |            | 285/93 |

(Continued)

*Primary Examiner* — Matthew Troutman
*Assistant Examiner* — Fannie C Kee
(74) *Attorney, Agent, or Firm* — Warner Norcross + Judd LLP

(57) ABSTRACT

A quick connection device with a double-checked locking mechanism includes a connection housing and a locking mechanism, the locking mechanism including a first locking mechanism inserted into the connection housing and having a pedestal from which a pair of retaining arms extends, the pair of retaining arms being connected by a connection strip to form a retaining ring for fitting with an opposite plug-in tube, and having an elastic reset component; and a second locking mechanism inserted into the connection housing having a base from which locking arms and holding arms extend, the first locking mechanism being inserted between the locking arms and the holding arms, wherein the locking arms support a portion of the first locking mechanism and the second locking mechanism prevents movement of the first locking mechanism from the locked position to an unlocked position when the second locking mechanism is in a locked position.

19 Claims, 14 Drawing Sheets

(56) References Cited

U.S. PATENT DOCUMENTS

| | | | | |
|---|---|---|---|---|
| 9,016,729 B2* | 4/2015 | Ishida | ............... | F16L 37/0885 |
| | | | | 285/321 |
| 2003/0218335 A1* | 11/2003 | Takayanagi | ......... | F16L 37/0987 |
| | | | | 285/319 |
| 2014/0312614 A1* | 10/2014 | Barthel | ............. | F16L 37/1225 |
| | | | | 285/319 |
| 2016/0201835 A1* | 7/2016 | Jones | ............... | F16L 37/0841 |
| | | | | 285/305 |

* cited by examiner

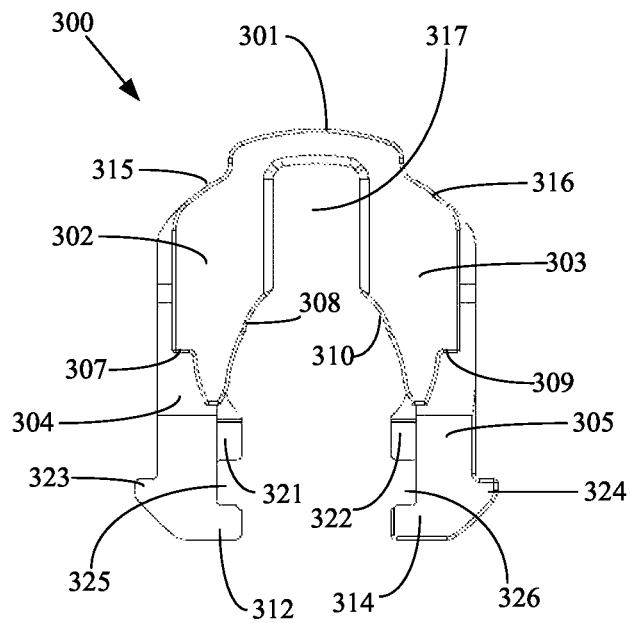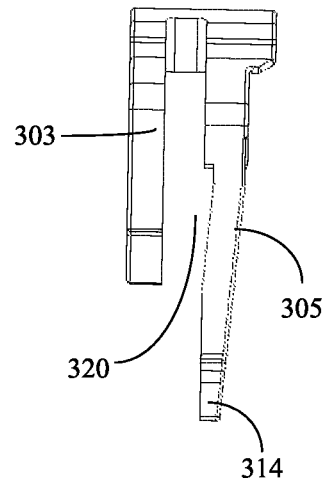
FIG.3a  FIG.3b
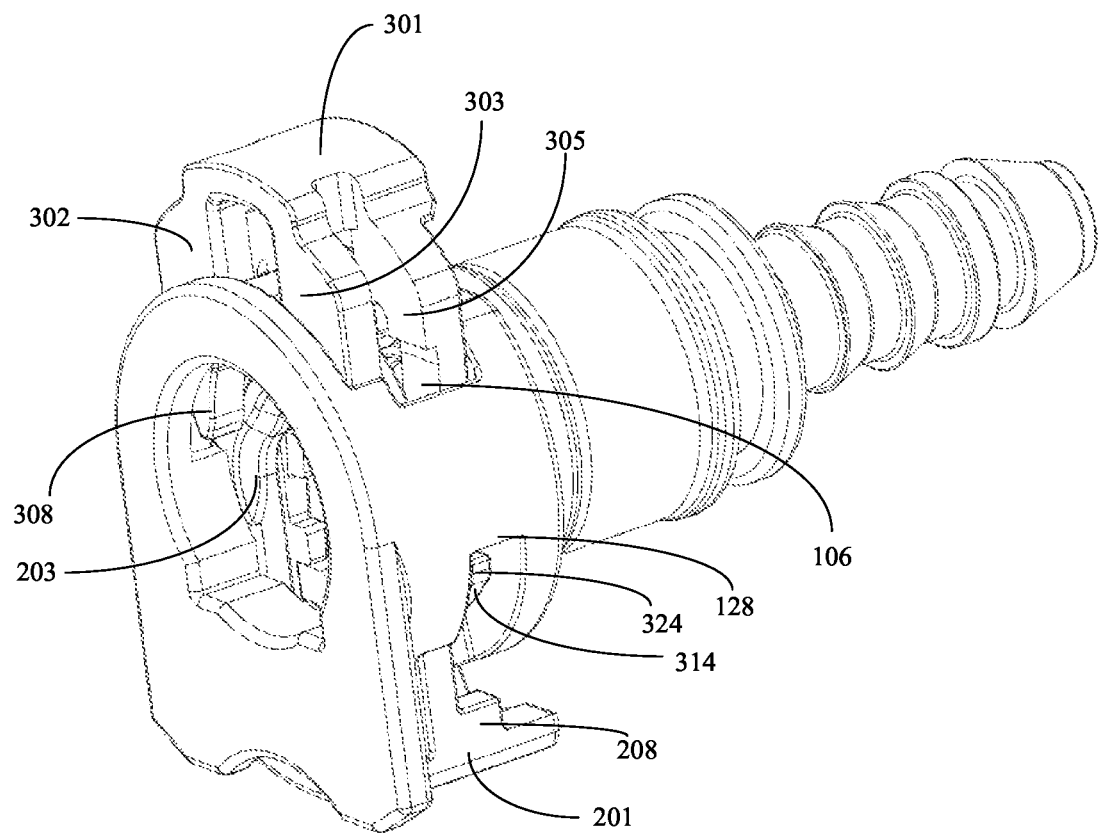
FIG.4

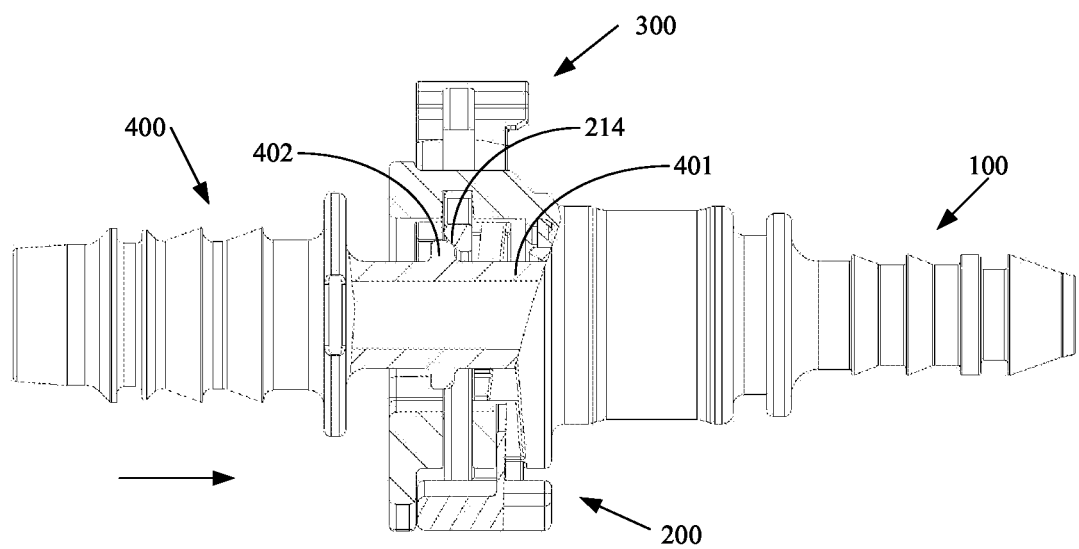
FIG.6a
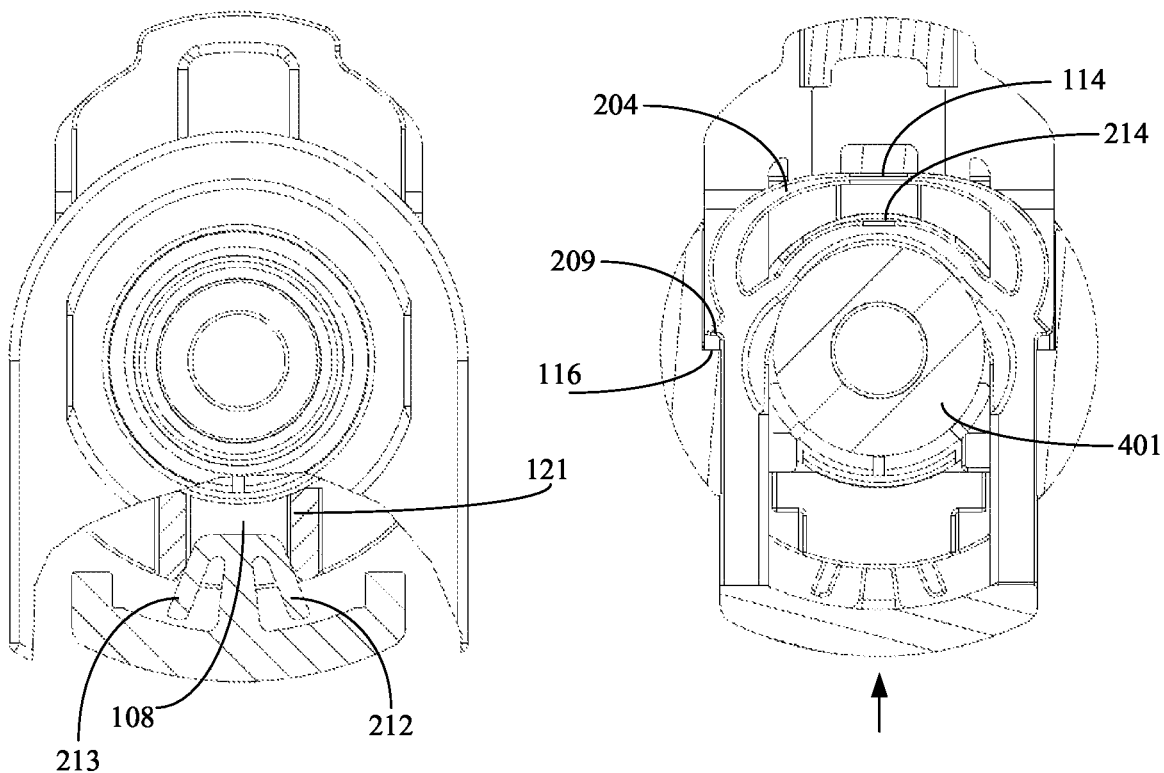
FIG.6b
FIG.6c

QUICK-CONNECTION DEVICE HAVING DOUBLE LOCKING MECHANISM

FIELD OF THE DISCLOSURE

The disclosure generally relates to the field of quick connectors, and more specifically, to a quick connection device having a double-checked locking mechanism for connecting one fluid line/device to another fluid line/device.

RELATED TECHNOLOGY

A quick connector or an engagement connector is widely applied in large-scale occasions, particularly in automobile industry, and generally used for connecting one fluid line (for example fuel lines) with another fluid line or quickly connecting one plug-in-part with another plug-in-part.

Generally, a quick connector used for fuel lines includes a connection housing for accommodating an opposite plug-in tube. Most of the opposite plug-in tubes have annular ribs for fitting with the locking mechanism in the connection housing, such that a fixed connection between the opposite plug-in tube and the connection housing is attained. There are different types of locking structures including a separate retaining ring, for example as disclosed in U.S. Pat. No. 6,086,119A. However, the locking and release of the retaining ring depends on elasticity of an elastic connection strip itself. When the quick connector is used under high temperature circumstances, plastic materials are subject to aging and lose elasticity, thereby resulting in unreliable locking of the opposite plug-in tube and even leakage of a fluid system. In an improved structure, a double-checked locking structure is provided. In the double-checked locking structure, a secondary locking structure in addition to a primary locking structure is configured to ensure that the opposite plug-in tube is retained in the connection housing in case of failure of the primary locking structure. However, even with the double-checked locking structure, there still exist deficiencies such as unstable locking and incapability of accurately determining whether the plug-in tube is inserted in place.

SUMMARY OF THE DISCLOSURE

The objective of the disclosure is to improve the quick connector in the prior art and to provide a quick connection device with a double-checked locking mechanism that is compact in size and has a simple and effective structure, which ensures stable connection between the opposite plug-in tube and the connection housing when the insertion is completed, while having an indication function of insertion status, thus avoiding incomplete insertion or failure of connection.

Therefore, in accordance with one aspect of the disclosure, a quick connection device with a double-checked locking mechanism is provided, the quick connection device comprising: a connection housing having an opened passage for receiving an opposite plug-in tube and a channel for accommodating the locking mechanism, wherein the locking mechanism comprises a first locking mechanism inserted into the connection housing and having a pedestal from which a pair of retaining arms extends perpendicularly, the pair of retaining arms being connected by a connection strip to form a retaining ring for fitting with the opposite plug-in tube, and further having an elastic reset component for retaining the first locking mechanism in a locked position; and a second locking mechanism inserted into the connection housing in a direction opposite to the insertion direction of the first locking mechanism, and having a base from which locking arms and the holding arms extend perpendicularly, the first locking mechanism being inserted between the locking arms and the holding arms, wherein the locking arms at least support a portion of the first locking mechanism and the second locking mechanism prevents movement of the first locking mechanism from the locked position to an unlocked position when the second locking mechanism is in a locked position.

In accordance with the foregoing technical concept, the disclosure may further include any one or more of the following preferred forms.

In some preferred forms, the elastic reset component comprises a pair of reset arms, the pair of reset arms being configured as a pair of connected arcuate arms between the connection housing and the retaining ring.

In some preferred forms, the elastic reset component comprises a pair of reset arms, the pair of reset arms being configured as a pair of separated arcuate arms between the connection housing and the retaining ring.

In some preferred forms, buffer portions are disposed between the arcuate arms and the retaining ring.

In some preferred forms, the locking arms of the second locking mechanism are configured to extend toward the arcuate shaped surface of the inner wall of the connection housing to form an extension portion, so as to support the retaining arms and the retaining ring of the first locking mechanism.

In some preferred forms, the first locking mechanism further comprises an auxiliary elastic reset component which extends perpendicularly from the pedestal and elastically abuts against the connection housing.

In some preferred forms, the auxiliary elastic reset component comprises a boss extending perpendicularly from the pedestal and elastic fins obliquely extending from the free end of the boss toward the pedestal.

In some preferred forms, the first locking mechanism comprises a shoulder extending from the pedestal toward the free ends of the holding arms of the second locking mechanism, and the free ends abut against the shoulder when the second locking mechanism is in the locked position.

In some preferred forms, the pair of retaining arms of the first locking mechanism is respectively provided with a stopping rib which is capable of retaining the first locking mechanism in the connection housing.

In some preferred forms, the retaining ring of the first locking mechanism comprises an arcuate portion mated with an insert part of the opposite plug-in tube.

In accordance with another aspect of the disclosure, a quick connection device with a double-checked locking mechanism is provided, the quick connection device comprising: a connection housing having an opened passage for receiving an opposite plug-in tube and a channel for accommodating the locking mechanism, wherein the locking mechanism comprises a first locking mechanism inserted into the connection housing and having a pedestal from which a pair of retaining arms extends perpendicularly, the pair of retaining arms being connected by a connection strip to form a retaining ring for fitting with the opposite plug-in tube, and further having an elastic reset component for retaining the first locking mechanism in a locked position, the elastic reset component extending perpendicularly from the pedestal and elastically abutting against the connection housing; and a second locking mechanism inserted into the connection housing in a direction opposite to the insertion direction of the first locking mechanism, and having a base from which locking arms and holding arms extend perpendicularly, the first locking mechanism being inserted between the locking arms and the holding arms, wherein the locking arms at least support a portion of the first locking mechanism and the second locking mechanism prevents movement of the first locking mechanism from the locked position to an unlocked position when the second locking mechanism is in a locked position.

In accordance with the foregoing technical concept, the disclosure may further include any one or more of the following preferred forms.

In some preferred forms, the first locking mechanism further comprises a pair of positioning arms extending from the connection housing, the free ends of the positioning arms respectively bending to form a hook to engage the outer wall surface of the connection housing, such that the first locking mechanism is retained in the connection housing.

In some preferred forms, the elastic reset component comprises a column perpendicularly extending from the pedestal, plug pieces adjacent to the column, and an elastic piece fixedly fitting with the column, wherein the elastic piece is fixed at the free ends of the column and elastically abutted against the connection housing.

In some preferred forms, the locking arms of the second locking mechanism are configured to extend toward the arcuate shaped surface of the inner wall of the connection housing to form an extension portion, so as to support the retaining arms and the retaining ring of the first locking mechanism.

In some preferred forms, the first locking mechanism comprises a shoulder extending from the pedestal toward the free ends of the holding arms of the second locking mechanism, and the free ends abut against the shoulder when the second locking mechanism is in the locked position.

In accordance with one further aspect of the disclosure, a quick connection device with a double-checked locking mechanism is provided, the quick connection device comprising: a connection housing having an opened passage for receiving an opposite plug-in tube and a channel for accommodating the locking mechanism, wherein the locking mechanism comprises a first locking mechanism inserted into the connection housing and having a pedestal from which a pair of retaining arms extends perpendicularly, the pair of retaining arms being connected by a connection strip to form a retaining ring for fitting with the opposite plug-in tube, a pair of positioning arms being configured to extend from the retaining arms to elastically abut against the connection housing so as to retain the first locking mechanism in a locked position; and a second locking mechanism inserted into the connection housing in a direction opposite to the insertion direction of the first locking mechanism, and having a base from which locking arms and the holding arms extend perpendicularly, the first locking mechanism being inserted between the locking arms and the holding arms, wherein the locking arms at least support a portion of the first locking mechanism and the second locking mechanism prevents movement of the first locking mechanism from the locked position to an unlocked position when the second locking mechanism is in a locked position.

In accordance with the foregoing technical concept, the disclosure may further include any one or more of the following preferred forms.

In some preferred forms, the free ends of the pair of positioning arms of the first locking mechanism respectively bend to form hooks to engage the outer wall surface of the connection housing, such that the first locking mechanism is retained in the connection housing.

In some preferred forms, the first locking mechanism further comprises an auxiliary elastic reset component comprising a U-shaped column extending perpendicularly from the pedestal and a spring fixedly fitting with the U-shaped column, the U-shaped column comprising a pair of upright walls, the spring being positioned in a fitting groove between the upright walls and elastically abutting against the connection housing.

In some preferred forms, the locking arms of the second locking mechanism are configured to extend toward the arcuate shaped surface of the inner wall of the connection housing to form an extension portion, so as to support the retaining arms and the retaining ring of the first locking mechanism.

In some preferred forms, the first locking mechanism comprises a shoulder extending from the pedestal toward the free ends of the holding arm of the second locking mechanism, and the free ends abut against the shoulder when the second locking mechanism is in the locked position.

In the quick connection device with a double-checked locking mechanism of the disclosure, the first locking mechanism ensures reliable locking with the opposite plug-in tube even if the second locking mechanism is unlocked. Meanwhile, a visual indication is further provided to determine whether the opposite plug-in tube is fully inserted and the insertion is in place. When the second locking mechanism is in the locked position, the first locking mechanism and the second locking mechanism are supported and interfered by one another to prevent the first locking mechanism being in unlock position, thereby more effectively ensuring stable connection of the opposite plug-in tube. The first locking mechanism and the second locking mechanism are simple in structure, close fitted, and easy to operate.

BRIEF DESCRIPTION OF THE DRAWINGS

The other features and advantages of the disclosure would be better understood by the following preferred embodiments illustrated in the drawings. The same reference numerals in the drawings identify the same or similar parts, wherein:

FIG. 3a is a plan schematic view of the second locking mechanism in the quick connection device as illustrated in FIG. 1;

FIG. 3b is a side schematic view of the second locking mechanism;

FIG. 4 is a schematic view of the quick connection device as illustrated in FIG. 1 which is free of an opposite plug-in tube;

FIG. 6a is a partial sectional schematic view of the quick connection device in which the opposite plug-in tube is partially inserted and causes the first locking mechanism to tend to move toward the unlocked position;

FIG. 6b is a partial sectional schematic view of the first locking mechanism and the second locking mechanism in the state shown in FIG. 6a;

FIG. 6c is a sectional schematic view of the first locking mechanism and the second locking mechanism in the state shown in FIG. 6a;

FIG. 7b is a partial sectional schematic view of the first locking mechanism and the second locking mechanism in the state shown in FIG. 7a;

FIG. 7c is a sectional schematic view of the first locking mechanism and the second locking mechanism in the state shown in FIG. 7a;

DETAILED DESCRIPTION

Figure 1:
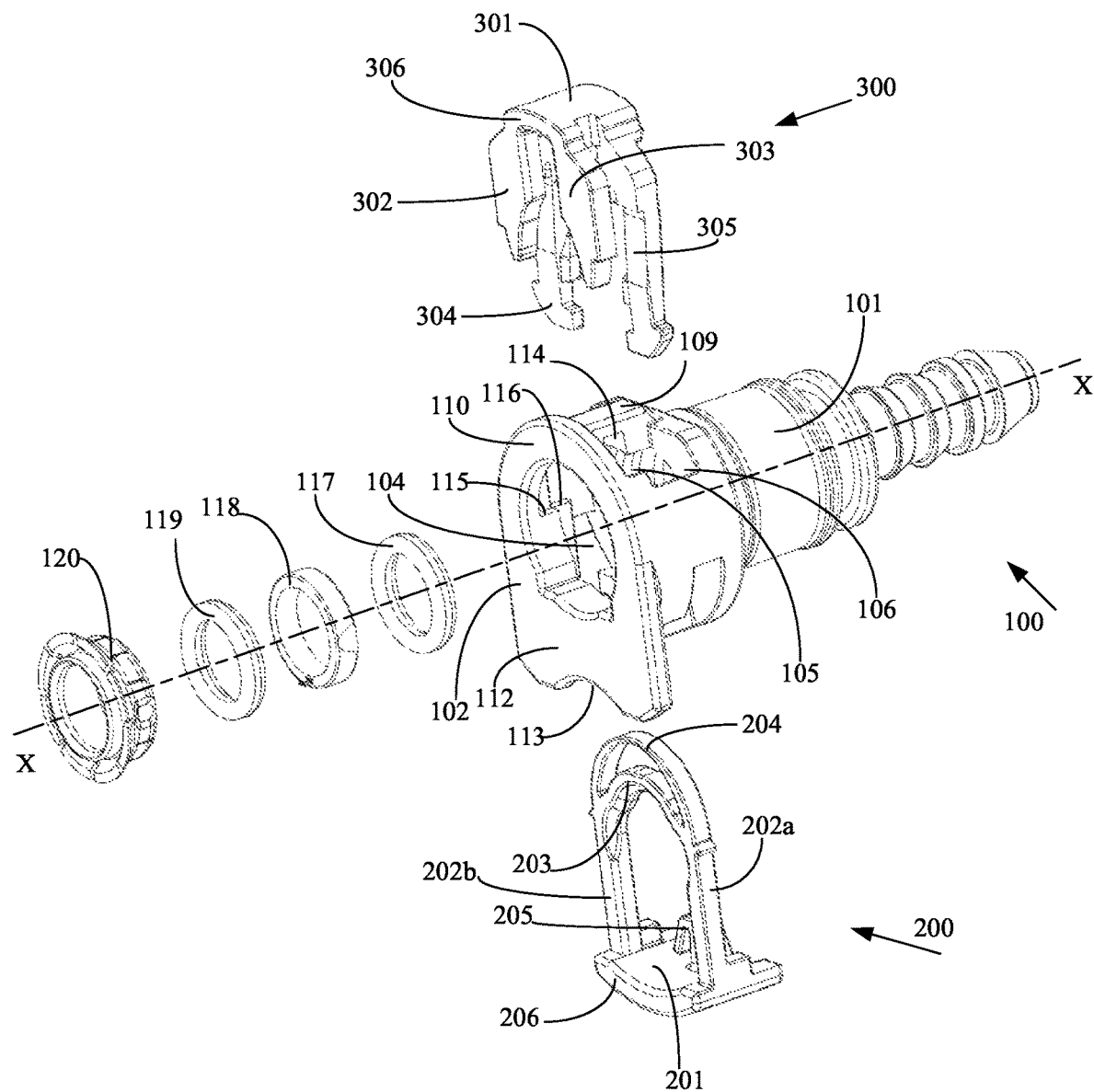
FIG. 1 is an exploded schematic view of the quick connection device in accordance with the first preferred embodiment of the disclosure.

Implementation and usage of the examples are discussed in detail with the drawings. However, it should be understood that the detailed description discussed herein merely demonstratively illustrates a particular way of implementing and using the present disclosure without limiting the scope of the present disclosure. The structural position of each part, when described, for example with the expressions like upper, lower, top and bottom, is not absolute but relative. When each part is arranged according to the drawings, these expressions are appropriate. However, when the position of each part in the drawings is changed, these expressions also change correspondingly.

FIG. 1 illustrates an exploded schematic view of the quick connection device in accordance with the first preferred embodiment of the disclosure. In the embodiment, a quick connection device comprises a connection housing 100, a first locking mechanism 200 and a second locking mechanism 300. The connection housing 100 comprises a receiver 101 which is provided with an opened passage 104 for receiving an opposite plug-in tube and a channel for accommodating the first locking mechanism 200 and the second locking mechanism 300. The connection housing 100 further comprises a seal assembly and a holding ring 120, wherein in the illustrated embodiment, the seal assembly comprises seal rings 117, 119 and a middle ring 118 disposed therebetween. Once the opposite plug-in tube is inserted into the quick connection device, the seal rings 117, 119 and the middle ring 118 seal the opened passage 104 of the connection housing 100 and seal against the abutment end surface of the holding ring 120.

Figure 2A:
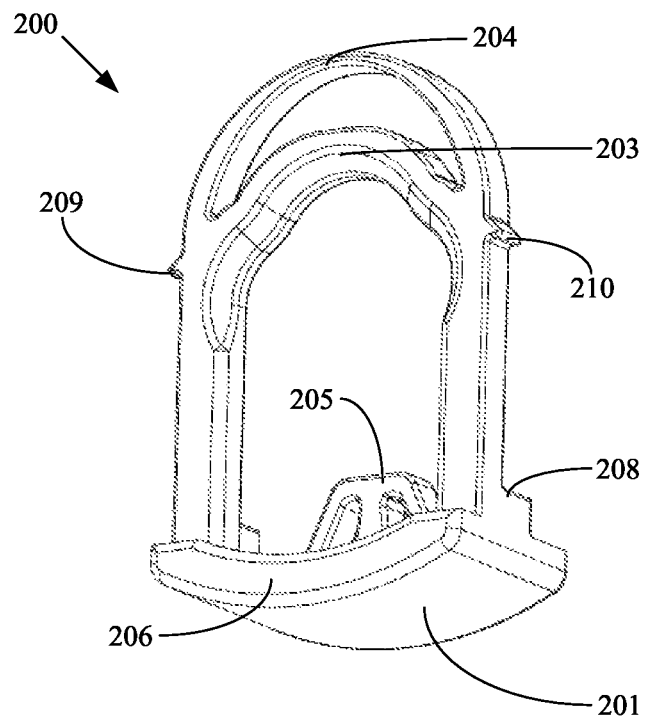
FIG. 2a is a perspective view of the first locking mechanism in the quick connection device as illustrated in FIG. 1.
Figures 2B, 2C:
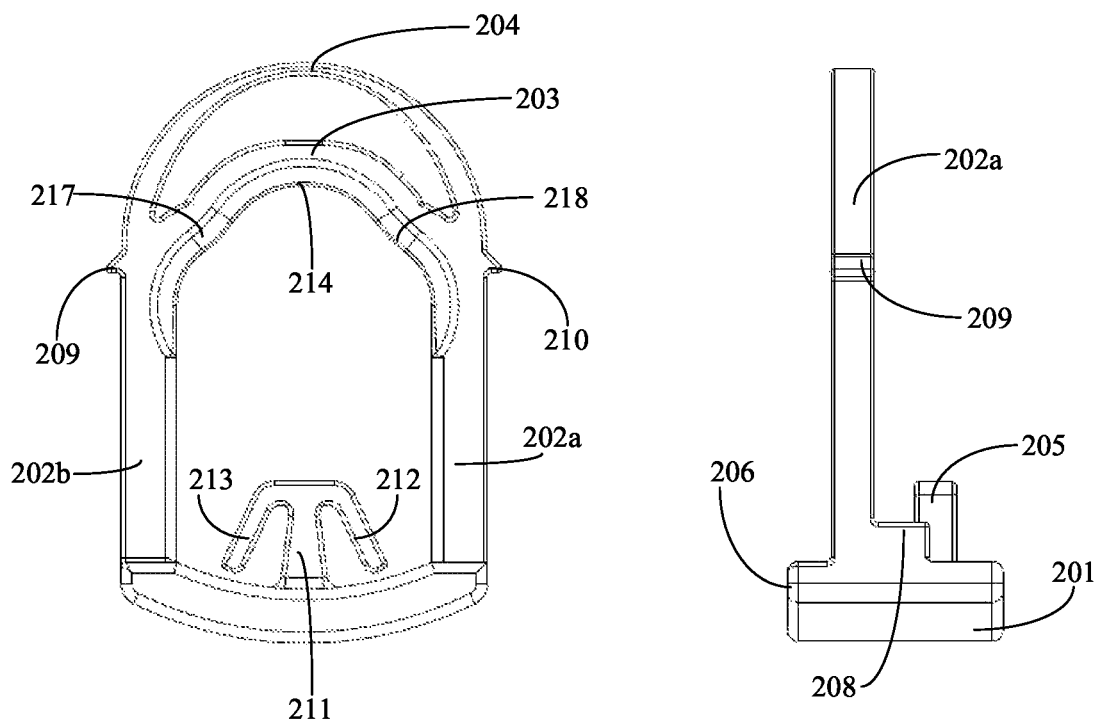
FIG. 2b is a plan schematic view of the first locking mechanism.
FIG. 2c is a side schematic view of the first locking mechanism.

In accordance with FIG. 2a to FIG. 2c, the first locking mechanism 200 is inserted into the connection housing 100 preferably perpendicular to the axis X-X of the connection housing 100, for example being inserted from below as illustrated in the drawings, and comprises a pedestal 201 from which a pair of retaining arms 202a, 202b extends perpendicularly, the pair of retaining arms 202a, 202b being connected by a connection strip 203 to form a retaining ring for fitting with the opposite plug-in tube. The first locking mechanism 200 further comprises an elastic reset component 204 for retaining the first locking mechanism 200 in the locked position. In the embodiment, the elastic reset component comprises a pair of reset arms disposed between the connection housing and the retaining ring. The first locking mechanism 200 further comprises an auxiliary elastic reset component 205 which extends perpendicularly from the pedestal 201 and elastically abuts against the connection housing 100. Preferably, the auxiliary elastic reset component 205 is arranged in a position axially spaced from the retaining arms 202a, 202b along the insertion direction of the opposite plug-in tube. Under the action of the elastic reset component 204 and the auxiliary elastic reset component 205, the first locking mechanism 200 is capable of independently retaining the opposite plug-in tube in the opened passage 104 when the second locking mechanism 300 is unlocked.

In the first preferred embodiment as illustrated in the drawings, a pair of reset arms of the elastic reset component 204 is configured as a pair of connected arcuate arms between the connection housing and the retaining ring, such that the arcuate arms abut against the wall surface of the connection housing and would be elastically pressed upon inserting into the opposite plug-in tube, and retain the first locking mechanism in the locked position by means of elastic reset of the arcuate arms after a full insertion of the opposite plug-in tube. Additionally, in the embodiment, the auxiliary elastic reset component 205 preferably comprises a boss 211 extending perpendicularly from the pedestal 201 and elastic fins 212, 213 obliquely extending from the free end of the boss 211 toward the pedestal 201, and an angle is formed between each of the elastic fins 212, 213 and the boss 211.

In some embodiments, the pair of retaining arms 202a, 202b of the first locking mechanism 200 is respectively provided with stopping ribs 209, 210, and the stopping ribs 209, 210 abut against the corresponding structures of the connection housing when the elastic reset component 204 is not deformed by pressing in an initial position. For example, FIG. 1 illustrates a stopping bump 116 on one side wall of the connection housing, thereby radially positioning the first locking mechanism and preventing the first locking mechanism 200 from disengaging from inside of the connection housing 100 due to the elasticity of the elastic reset component 204. The arrangement of the stopping bump 116 and the stopping ribs 209, 210 is capable of selectively maintaining initial preload between the elastic reset component 204 and the connection housing. Additionally, the retaining ring of the first locking mechanism 200 preferably comprises an arcuate portion 214 mated with an insert part of the opposite plug-in tube, wherein the arcuate portion 214 and the retaining arms 202a, 202b transit in arc at transition portions 217, 218. Preferably, the arcuate portion and the transition portions have sloping guide surfaces to facilitate guidance of the insertion of the opposite plug-in tube.

A second locking mechanism 300 is inserted into the connection housing 100 in a direction opposite to the insertion direction of the first locking mechanism 200, for example being inserted from above as illustrated in the drawings. In accordance with FIG. 3a and FIG. 3b, the second locking mechanism 300 comprises a base 301 from which a pair of locking arms 302, 303 and a pair of holding arms 304, 305 extend perpendicularly, wherein the holding arms 304, 305 are configured to be longer than the locking arms 302, 303. An interval 320 is provided between the pair of locking arms and the pair of holding arms, wherein the first locking mechanism 200 is inserted into the interval 320 formed between the locking arms and the holding arms. Favorably, the locking arms 302, 303 are capable of at least covering and supporting a portion of the first locking mechanism when the second locking mechanism is in the locked position. For example, as illustrated in FIG. 3a, the locking arms 302, 303 are formed with greater area and especially configured to extend toward the arcuate shaped surface of the inner wall of the connection housing to form an extension portion. In this way, when the locking arms 302, 303 abut against the structures of the first locking mechanism, for example the retaining arms 202a, 202b and the retaining ring, the reliability of the axial positioning of the first locking mechanism relative to the opposite plug-in tube is enhanced, thus avoiding shaking of the components or release of the locked state. Additionally, when the second locking mechanism 300 is in the locked position, the first locking mechanism 200 and the second locking mechanism 300 are capable of being interference-fitted with each other to prevent the first locking mechanism from moving from the locked position to the unlock position, such that it is impossible to unlock the first locking mechanism in the unlocked state of the second locking mechanism 300, thereby more effectively ensuring a stable connection of the opposite plug-in tube. To this end, in the embodiment, the first locking mechanism 200 comprises a shoulder 208 extending from the pedestal 201 toward the free ends 312, 314 of the holding arms 304, 305 of the second locking mechanism, and the free ends 312, 314 are capable of abutting against the shoulder 208 when the second locking mechanism is in the locked position.

As can be seen in FIG. 1, in the embodiment, in correspondence with the structures of the first locking mechanism 200 and the second locking mechanism 300, a channel 105 of the locking arm for accommodating the locking arms 302, 303 of the second locking mechanism 300, a channel 106 for accommodating the holding arms 304, 305, and an interval portion 109 are formed in the receiver 101 of the connection housing 100, and the interval portion 109 corresponds to a distance 317 between the locking arms or the holding arms of the second locking mechanism 300. A slot 114 for abutting against the elastic reset component 204 of the first locking mechanism 200 is arranged at the lower end of the interval portion 109. An accommodation groove 108 for accommodating the auxiliary elastic reset component 205 is arranged on the connection housing in a position adjacent the channel of the first locking mechanism 200, and the opened elastic fins 212, 213 are inserted into the accommodation groove 108 and elastically abut against the side walls 121 thereof, which on one hand leads the movement of the first locking mechanism between the locked position and the unlocked position, and on the other hand avoids loosening of the first locking mechanism arranged in the connection housing by means of the cooperation of the auxiliary elastic reset component and the accommodation groove, such that the reliability of the connection system is enhanced.

Advantageously, a receiving plate 102 for fitting with the first locking mechanism 200 and the second locking mechanism 300 is arranged at an inlet end of the connection housing 101, wherein the opened passage 104 passes through the receiving plate 102 along the axis X-X. Upon inserting into the second locking mechanism 300, the upper end 110 of the receiving plate 102 would block the side surface 306 of the base 301 of the second locking mechanism 300. Upon inserting into the first locking mechanism 200, the lower end 112 of the receiving plate 102 would block the side surface 206 of the pedestal 201 of the first locking mechanism 200.

Moreover, the holding arms and the locking arms of the second locking mechanism 300 are provided respectively with a plurality of stopping structures and locking structures for fitting with the connection housing. In accordance with FIG. 3a and FIG. 8c, even if the locking arms 302, 303 are configured with a large area, the extension portions at the bottom of the locking arms 302, 303, which extend toward the arcuate shaped surface of the inner wall of the connection housing, may be configured as for example a tapered portion for fitting with the arcuate shaped surface of the inner wall 122, 123 of the connection housing and may be provided with arcuate surfaces 308, 310 toward the inside of the connection housing, such that the insertion of the opposite plug-in tube would not be hindered. Additionally, it would be noticed that the diameters of the arcuate surfaces 308, 310 shall be smaller than the diameters of the annular rib 402 of the opposite plug-in tube 400. With this arrangement, even if the first locking mechanism 200 fails to lock, the second locking mechanism 300 in the locked position can still retain the opposite plug-in tube 400 in the connection housing to avoid leakage of the fluid system. Additionally, end surfaces 307, 309 radially extending from the extension portions and abutting against steps 115 (only one step at one side is shown) on the connection housing are further provided. The holding arms 304, 305 may be provided with pillars 321, 322 protruding toward one another at the substantially central position, and further provided with abutment portions protruding toward one another or apart from each other at the position of the free ends 312, 314, for example, abutment portions 323, 324 protruding apart from each other as illustrated in FIG. 3a, thereby forming a structure of substantially clamping bump to maintain locking with the corresponding structure of the connection housing, for example a clamping bump 128 disposed in the channel 106 of the holding arms as illustrated in FIG. 4. The similar locking structure is various and well-known by a person skilled in the art, and thus it is merely regarded as an example in the illustrated embodiment and will not be described in detail.

The preferred embodiment is described in accordance with the specific insertion process of the opposite plug-in tube, such that the foregoing structural features and the structural features to be described below would be better understood. For simplicity, the structure on one side is illustrated and described in some examples of symmetrical structure.

Firstly, the opposite plug-in tube is not inserted in the state as illustrated in FIG. 4. The first locking mechanism is in the locked position and the second locking mechanism is in the unlocked position. The lower end 314 of the holding arm 305 of the second locking mechanism fails to contact the shoulder 208 of the first locking mechanism. The abutment portion 324 may engage with the clamping bump 128 to prevent the second locking mechanism from disengaging from the connection housing.

Figure 5A:
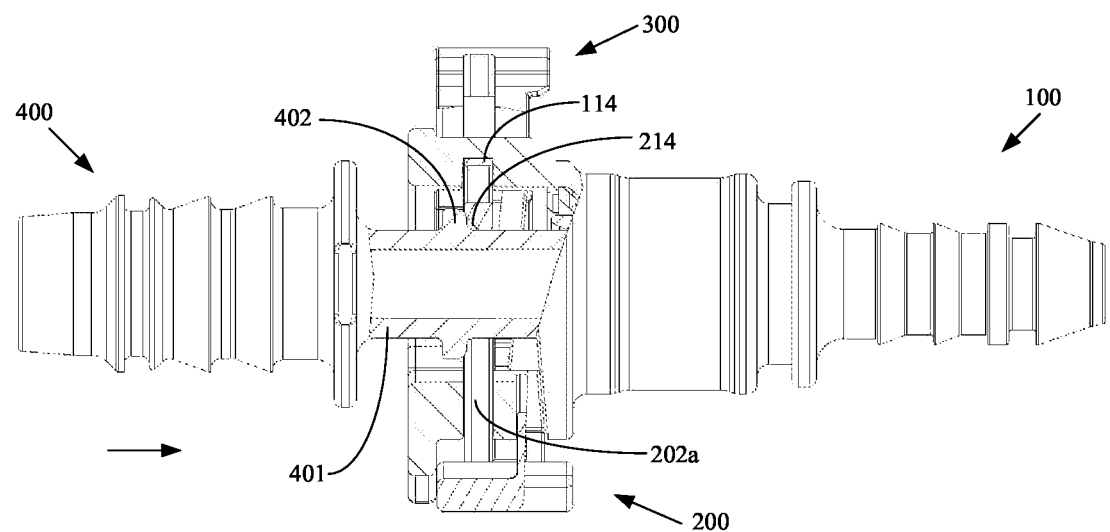
FIG. 5a is a partial sectional schematic view of the quick connection device in which the opposite plug-in tube is initially inserted.
Figure 5B:
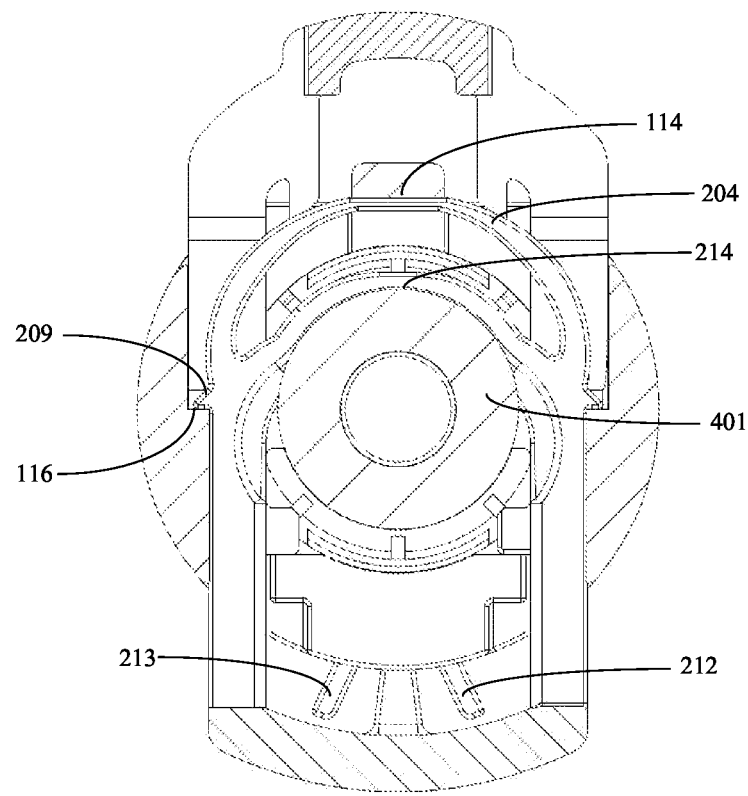
FIG. 5b is a sectional schematic view of the first locking mechanism and the second locking mechanism in an initial insertion state.

When the insert part 401 of the opposite plug-in tube 400 is inserted into the opened passage, the insert part 401 of the opposite plug-in tube passes through the opening of the retaining ring of the first locking mechanism, and the annular rib 402 starts to contact the arcuate portion 214 of the retaining ring of the first locking mechanism 200 and hinders insertion of the opposite plug-in tube 400, as shown in FIG. 5a and FIG. 5b. At this time, the annular rib 402 has not yet exerted any contact force to the arcuate portion 214, and thus the elastic force of the elastic reset component 204 of the first locking mechanism still retains the first locking mechanism 200 in the locked position. Further, the stopping rib 209 of the retaining arm pressurizes on the stopping bump 116 of the connection housing.

As illustrated in FIG. 6a to FIG. 6c, when the opposite plug-in tube is further inserted and the annular rib 402 of the opposite plug-in tube passes through the arcuate portion 214, the insertion force of the opposite plug-in tube urges the retaining ring of the first locking mechanism 200 to be pushed upward due to the arrangement of the arcuate portion 214 on the retaining ring and the included insertion surface of the annular rib 402. Moreover, the insertion force of the opposite plug-in tube 400 overcomes the elasticity generated by the deformed elastic reset component 204 pressed by the wall surface of the slot 114 of the connection housing, together with the recovery force of the elastic fins 212, 213 pressed by the side walls 121 of the accommodation groove, thus causing the first locking mechanism 200 to move integrally to the unlocked position, as illustrated in FIG. 6c.

Figure 7A:
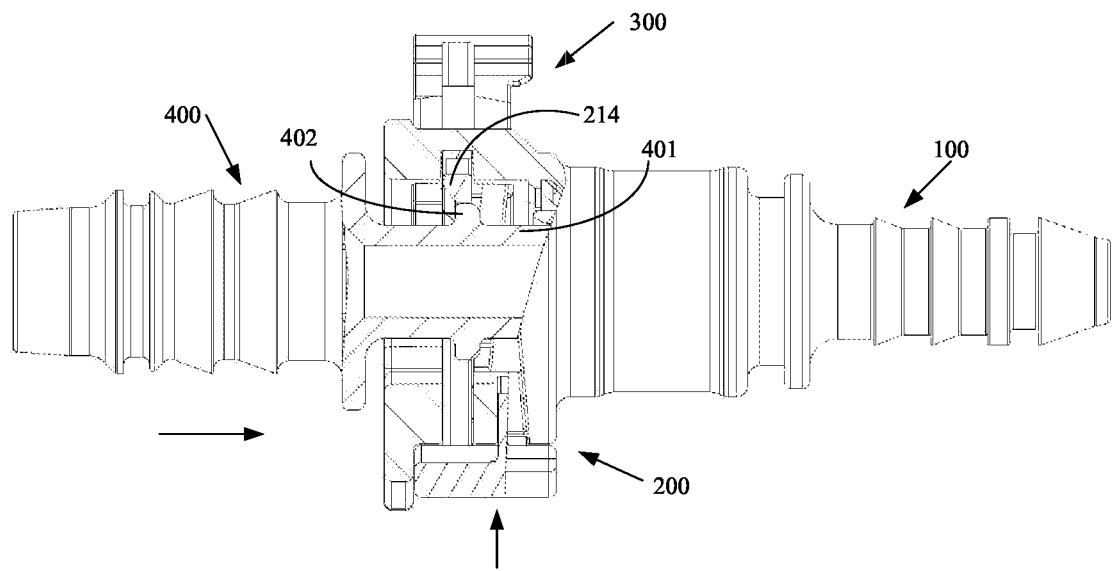
FIG. 7a is a sectional schematic view of the quick connection device in which the opposite plug-in tube is partially inserted and causes the first locking mechanism to further tend to move toward the unlocked position.
Figure 7B:
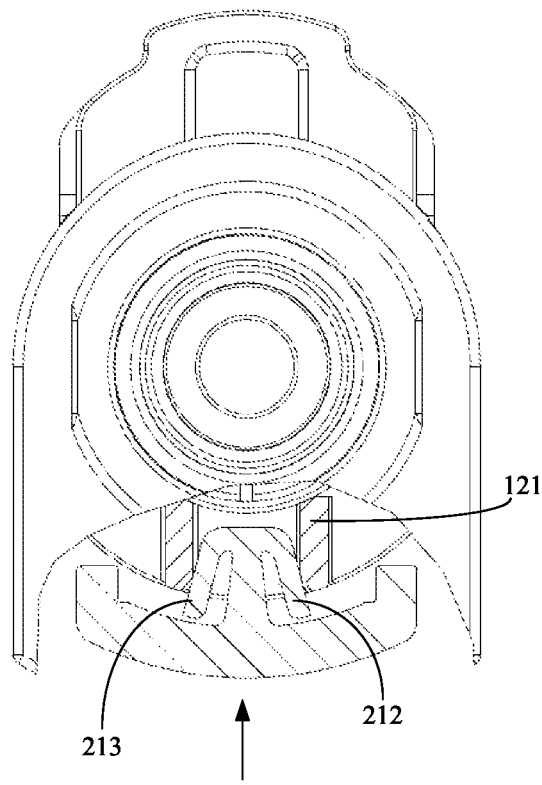
Figure 7C:
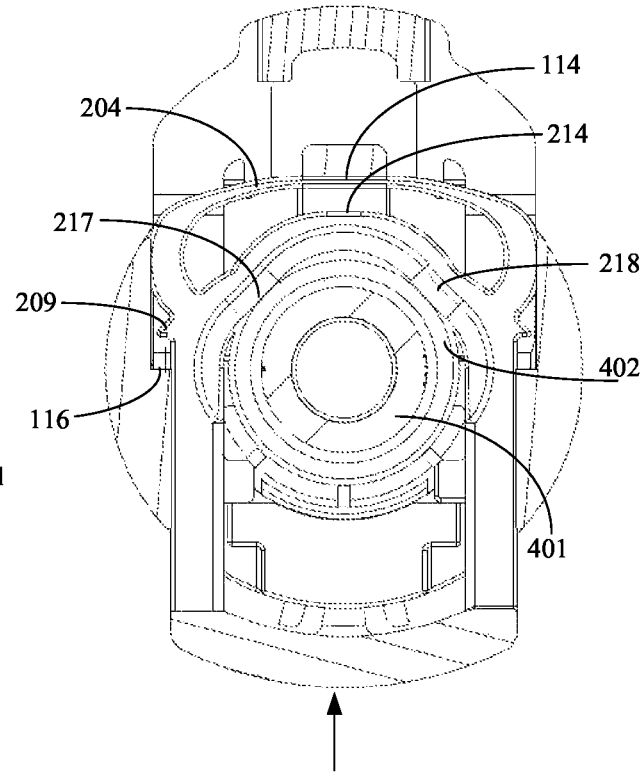

The opposite plug-in tube is continuously inserted, and the annular rib 402 of the opposite plug-in tube passes through the arcuate portion 214 of the retaining ring. The space between the retaining arms 202a, 202b of the first locking mechanism 200 is greater than the diameter of the annular rib 402. In other words, the annular rib 402 can pass through the retaining arms 202a, 202b and the end surface of the annular rib 402 contacts the contact end surface of the retaining ring, as illustrated in FIG. 7a to FIG. 7c. At this time, the retaining ring moves up to the unlocked position, the elastic reset component 204 continues to be pressed and deformed relative to the previous state, and the elastic fins 212, 213 of the auxiliary elastic reset component continuously move upward to enter into the accommodation groove of the connection housing and to be pressed and deformed by the side walls 121. In this moment, the annular rib 402 of the opposite plug-in tube 400 tends to pass through the retaining ring.

Figure 9A:
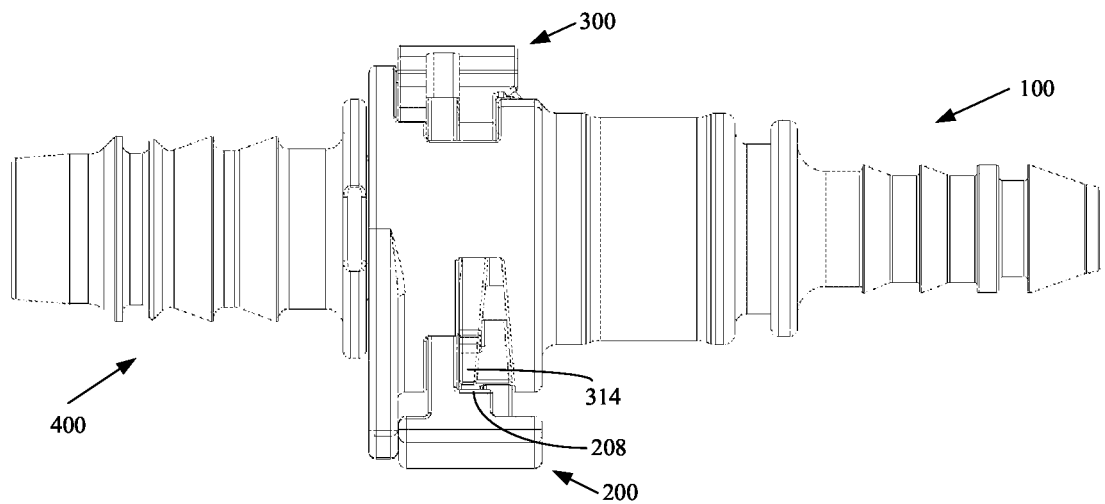
FIG. 9a is a side schematic view of the opposite plug-in tube and the quick connection device in the full insertion state and the second locking mechanism in the locked position.
Figure 9B:
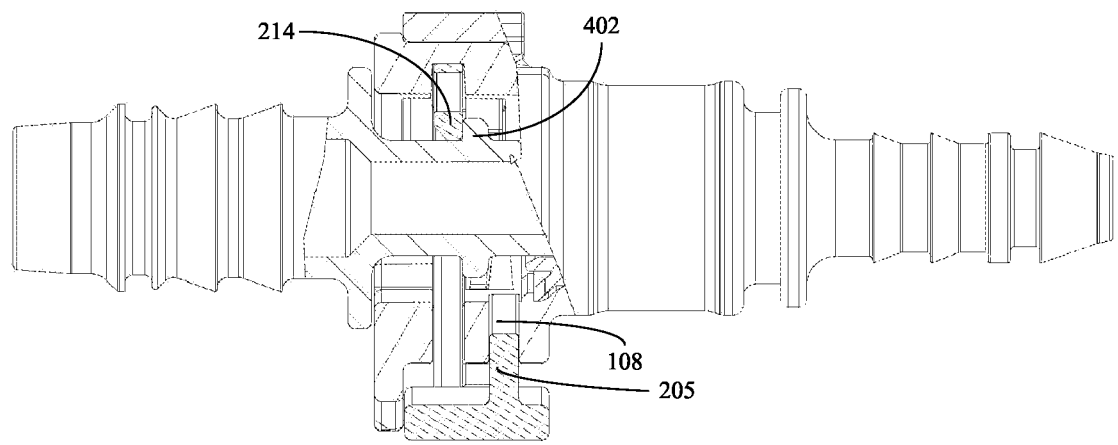
FIG. 9b is a partial sectional schematic view of the opposite plug-in tube and the quick connection device in a full locked state.

Once the annular rib 402 passes through the retaining ring, as illustrated in FIG. 9b, under the action of the elastic reset component and the auxiliary elastic reset component, the first locking mechanism 200 elastically resets downward to the locked position. Now, the retaining ring of the first locking mechanism 200 descends to contact against the annular rib 402, and the plane of the retaining ring opposite to the arcuate portion 214 engages with the vertical wall of the annular rib 402 of the opposite plug-in tube, such that the opposite plug-in tube is maintained in full insertion state via the retaining ring.

Figure 8A:
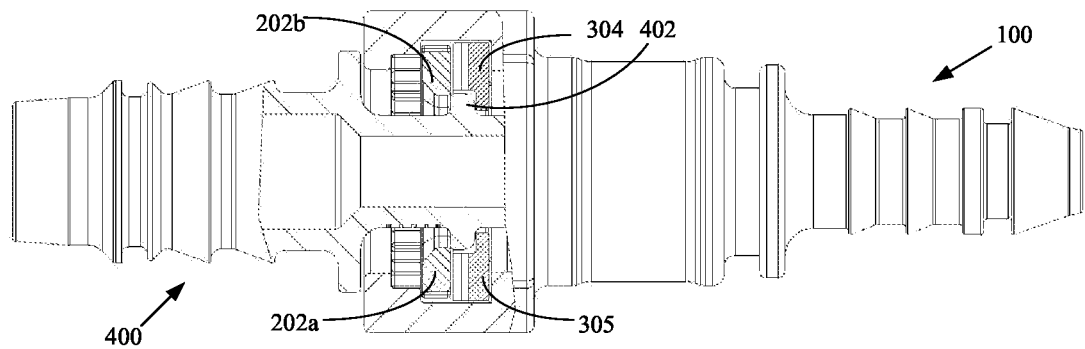
FIG. 8a is a partial sectional schematic view of the quick connection device in which the opposite plug-in tube is fully inserted.
Figure 8B:
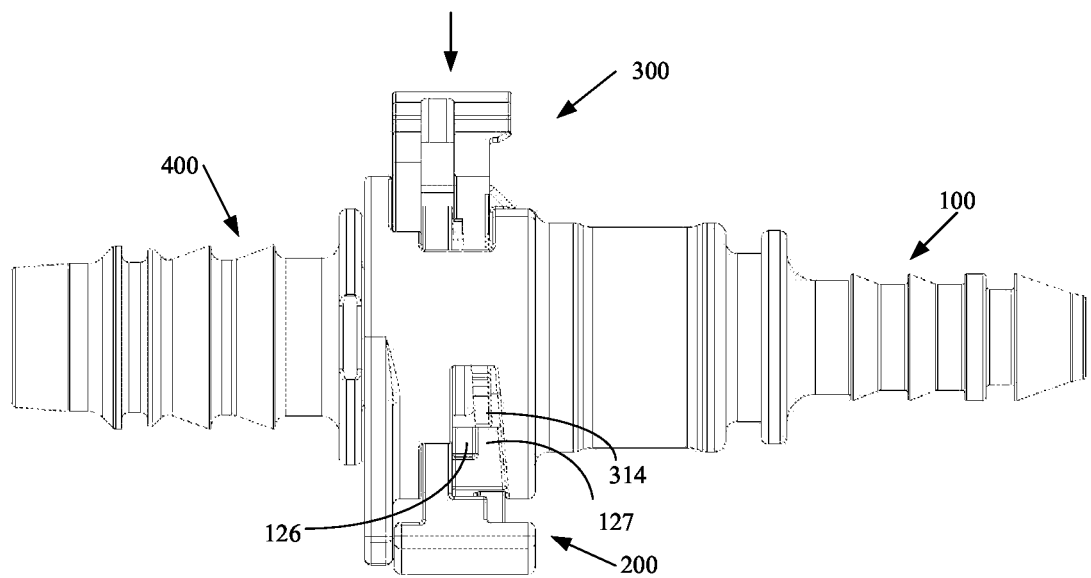
FIG. 8b is a side schematic view of the opposite plug-in tube and the quick connection device in a full insertion state and the first locking mechanism in the locked position.
Figure 8C:
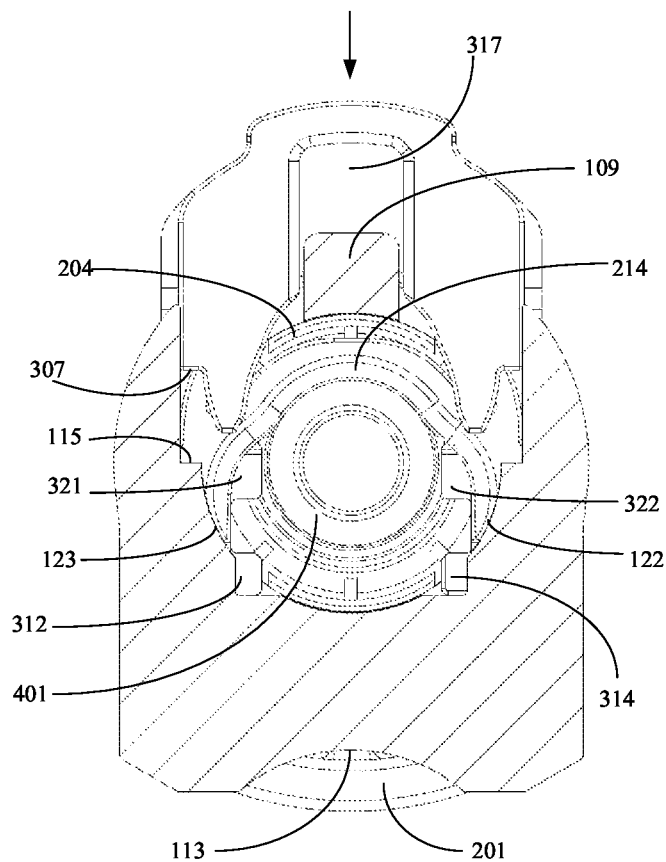
FIG. 8c is a sectional schematic view of the first locking mechanism and the second locking mechanism in the full insertion state.

FIG. 8a to FIG. 8c illustrate a process for pressing the second locking mechanism 300 to make it tend to move to the locked position when the first locking mechanism 200 is in the locked position. In the preferred embodiment, the connection housing 100 is provided with a stopping component 126 axially extending from the connection housing 100 at the extension position of the holding arms 304, 305 of the second locking mechanism 300 (see FIG. 8b), and with a gap 127 adjacent to the stopping component 126 to be passed by the holding arms. The holding arms 304, 305 of the second locking mechanism 300 may tend to be elastically deformed in the axial direction toward the locking arms 302, 303. For example, the holding arms can be disposed to slightly tilt in the axial direction as illustrated in FIG. 3b. Under the circumstance that no opposite plug-in tube is inserted or the opposite plug-in tube is not inserted into the specific position in the connection housing, the free ends 312, 314 of the holding arms contact the stopping component 126 to prevent the second locking mechanism 300 moving from the unlocked position to the locked position. It would be noted that FIG. 8a is a view of FIG. 7a or FIG. 6a by rotating 90 degree. When the opposite plug-in tube 400 fully passes through the retaining ring of the first locking mechanism to reach a full insertion position, the opposite plug-in tube is continuously inserted to make the annular rib 402 of the opposite plug-in tube contact the holding arms 304, 305 of the second locking mechanism. When the free ends of the holding arms 304, 305 are pushed above the gap 127, as illustrated in FIG. 8b, the second locking mechanism is pressed downward to cause the free ends 312, 314 of the holding arms to deform and pass through the gap 127 in the axial direction and to engage with the stopping component 126, such that the second locking mechanism 300 is in the locked position. In combination with FIG. 3a, engaging grooves 325, 326 can be formed between the pillars 321, 322 and the lower ends 312, 314 of the holding arms 304, 305 of the second locking mechanism 300, said engaging grooves can engage with the stopping component 126 and retain the second locking mechanism 300 in the locked position. Accordingly, in the illustrated embodiment, the second locking mechanism 300 has an indicating function which helps to determine whether the second locking mechanism is in the locked position by means of visualized hand feeling during the pressing process (or in accordance with the click sound generated by the engagement of the engagement groove and the stopping component).

Alternatively, the first locking mechanism 200 can also be provided with an indicating function. For example, an arcuate opening 113 can be formed at the bottom of the lower end 112 of the receiving plate 102. In this way, it is possible to visually indicate whether the opposite plug-in tube is inserted in place based on the position of the pedestal 201 of the first locking mechanism 200 relative to the connection housing 100, for example the protruded position relative to the arcuate opening 113. As illustrated in FIG. 8c, it can be determined visually or by hand touching from the arcuate opening 113 at the bottom of the connection housing whether the opposite plug-in tube is fully inserted into the predetermined/locked position, thereby further avoiding incomplete insertion or unexpected loosening of the opposite plug-in tube. Moreover, the arrangement of the arcuate opening 113 can also function to implement the pushing operation for unlocking the first locking mechanism.

If it is determined that the opposite plug-in tube is fully inserted and the first locking mechanism 200 is in the locked position, the second locking mechanism 300 is pressed downward to further lock the opposite plug-in tube.

Figure 9C:
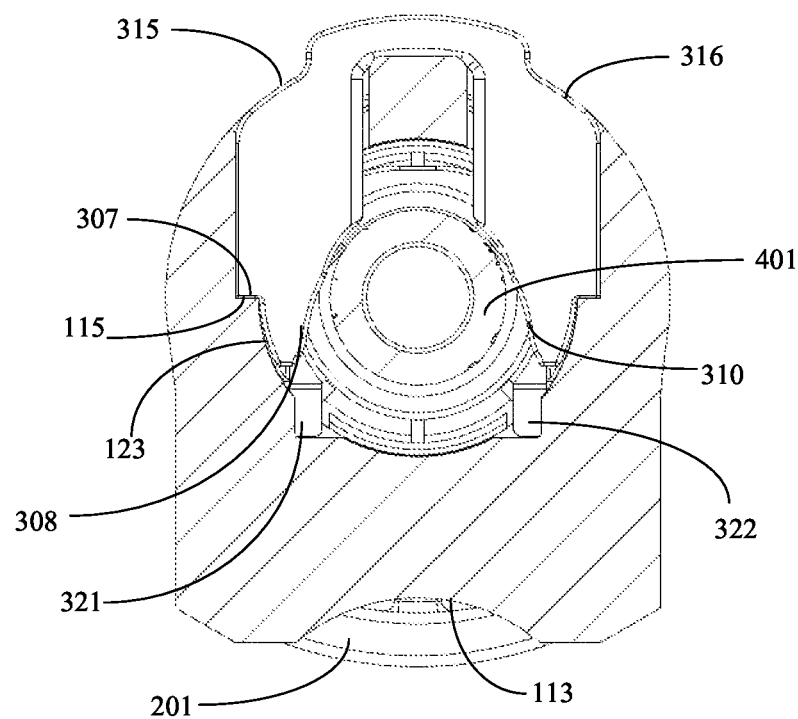
FIG. 9c is a sectional schematic view of the first locking mechanism and the second locking mechanism in the locked position.
Figure 9D:
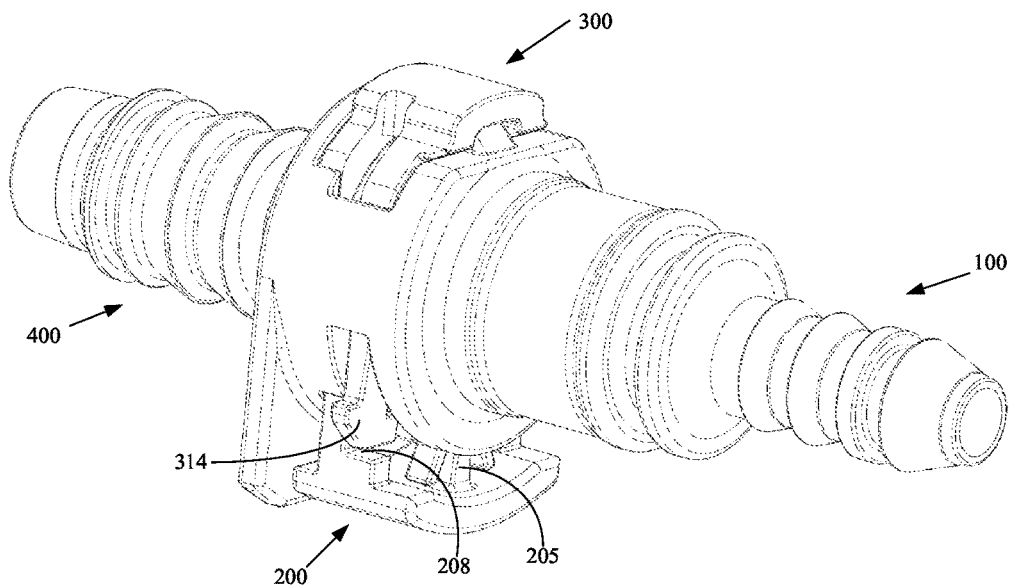
FIG. 9d is a perspective view of the opposite plug-in tube and the quick connection device in the full locked state.

After the second locking mechanism 300 is pressed downward and locked, the quick connection device is in the fully locked state as illustrated in FIG. 9a to FIG. 9d. In this moment, the stopping component 126 of the connection housing 100 engages with the engaging grooves 325, 326 of the second locking mechanism 300 to retain the locked state. The free end 314 of the holding arm of the second locking mechanism 300 abuts against the shoulder 208 of the first locking mechanism 200 to prevent movement of the first locking mechanism 200 from the locked position to the unlocked position. Particularly, the locking arms of the second locking mechanism cover and support a large portion of the retaining ring and the retaining arm of the first locking mechanism, as illustrated in FIG. 9c, thereby further ensuring reliability of the quick connection device for locking the opposite plug-in tube. It would be noted that even if the first locking mechanism 200 fails in locking and is impossible to fix the opposite plug-in tube, the opposite plug-in tube can be still retained in the connection device due to the arrangement of the locking arms of the second locking mechanism 300, thereby avoiding occurrence of liquid leakage. Additionally, the upper end of the second locking mechanism 300 can be provided with outer curved surfaces 315, 316 generally following to the outer surface of the connection housing. In this way, under the fully locked state, the locking mechanism does not significantly increase the dimension of the quick connection device and has good perceived quality.

In the first embodiment as illustrated in FIG. 1 to FIG. 9d, the pair of arcuate arms of the elastic reset component 204 is connected by one another. However, it may be understood that the pair of arcuate arms can also be separated from each other and form many abutment structures at the free ends thereof, such that a plurality of embodiments that would be deformed by pressing the corresponding structures on the connection housing can be obtained.

Figures 10, 11:
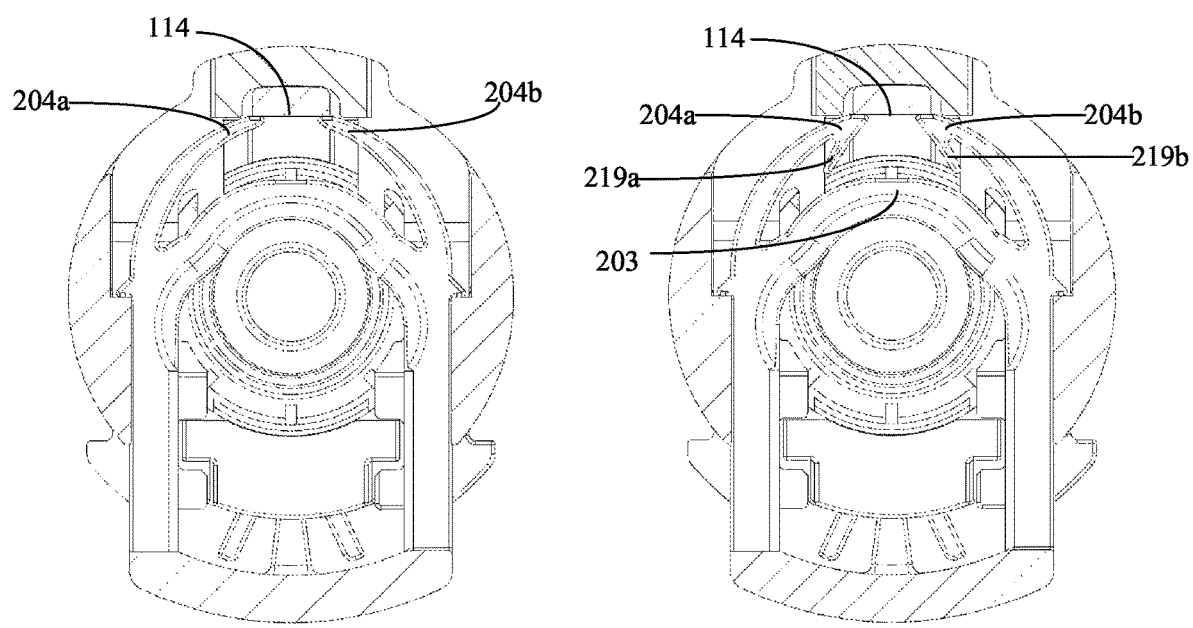
FIG. 10 is a sectional schematic view of the quick connection device in accordance with the second preferred embodiment of the disclosure, illustrating the first locking mechanism and the second locking mechanism in the initial insertion state.
FIG. 11 is a sectional schematic view of the quick connection device in accordance with the third preferred embodiment of the disclosure, illustrating the first locking mechanism and the second locking mechanism in the initial insertion state.

For example, in the second embodiment as illustrated in FIG. 10, a pair of arcuate arms 204a, 204b extends from the connection strip 203 and is separated from each other, thus the free ends of the arcuate arms 204a, 204b can be elastically deformed and reset by pressing the wall surface of the slot 114 of the connection housing.

In the third embodiment as illustrated in FIG. 11, a pair of arcuate arms 204a, 204b also extends from the connection strip 203 and is separated from each other. The difference is that a buffer portion is disposed between the arcuate arms 204a, 204b and the retaining ring. For example, the free ends of the arcuate arms are bent respectively to form buffer portions 219a, 219b. The buffer portions may improve strength of the arcuate arms 204a, 204b to some extent. For example, during unlocking the first locking mechanism, if the pedestal 201 is excessively pressed, the arcuate arms 204a, 204b may be excessively bent and fail in elasticity. In this case, the buffer portions 219a, 219b can contact the connection strip 203. Even if the arcuate arms tend to be fractured, the buffer portions would be fractured earlier than the arcuate arms, thus providing adequate buffering and protection.

Figure 12A:
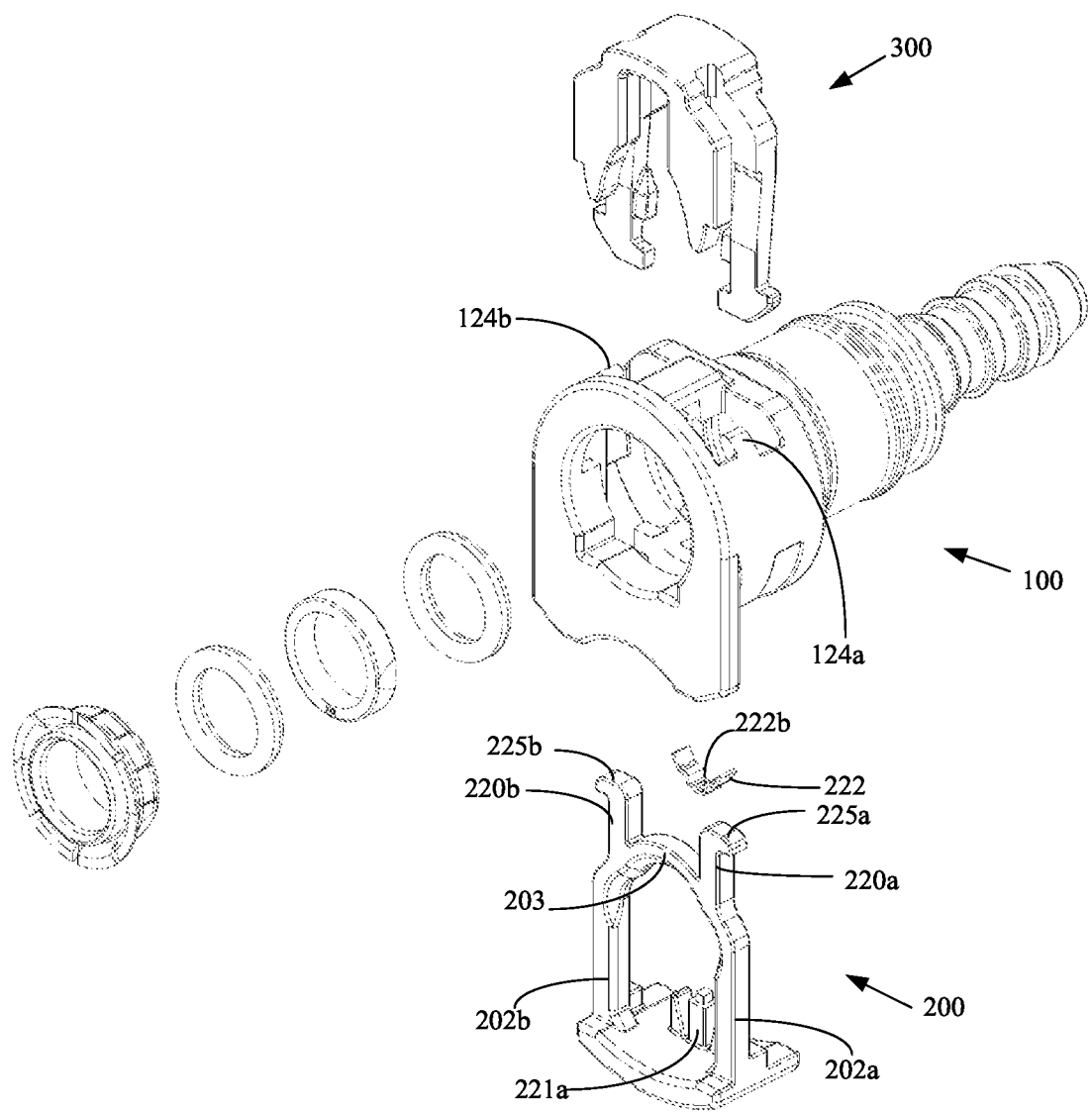
FIG. 12a is an exploded schematic view of the quick connection device in accordance with the fourth preferred embodiment of the disclosure.
Figure 12B:
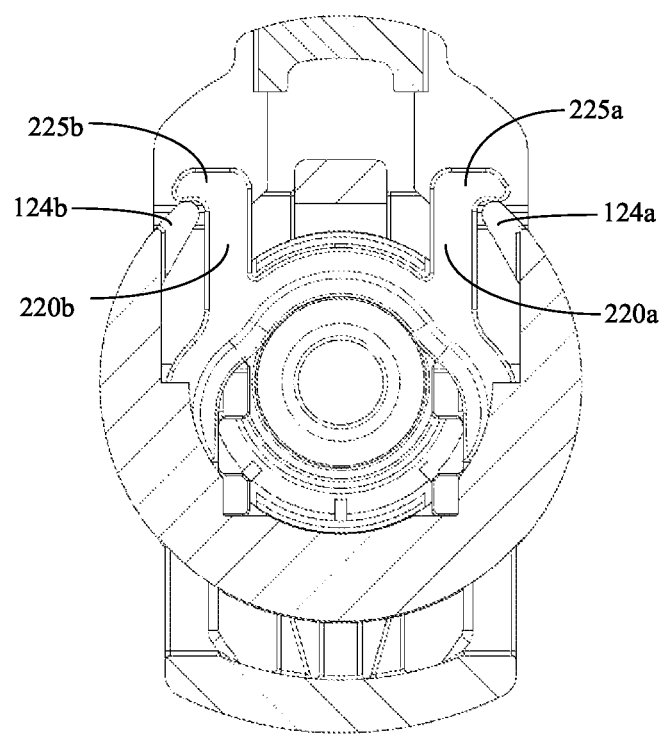
FIG. 12b is a sectional schematic view of the first locking mechanism and the second locking mechanism in the quick connection device as illustrated in FIG. 12a in the initial insertion state, illustrating a pair of positioning arms engaged with the outer wall surface of the connection housing.
Figure 12C:
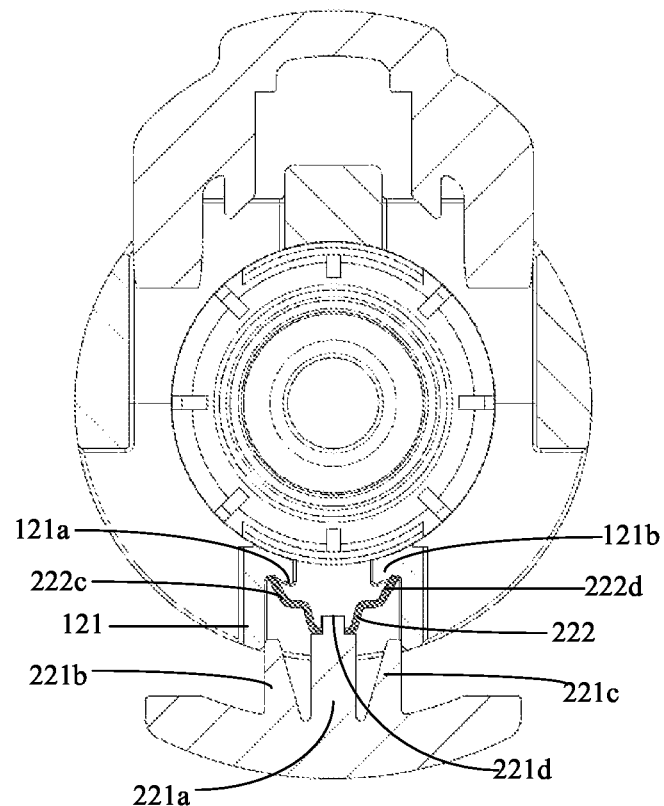
FIG. 12c is a sectional schematic view of the first locking mechanism and the second locking mechanism in the quick connection device as illustrated in FIG. 12a in the initial insertion state, illustrating an elastic reset component extending perpendicularly from the pedestal.
Figure 13A:
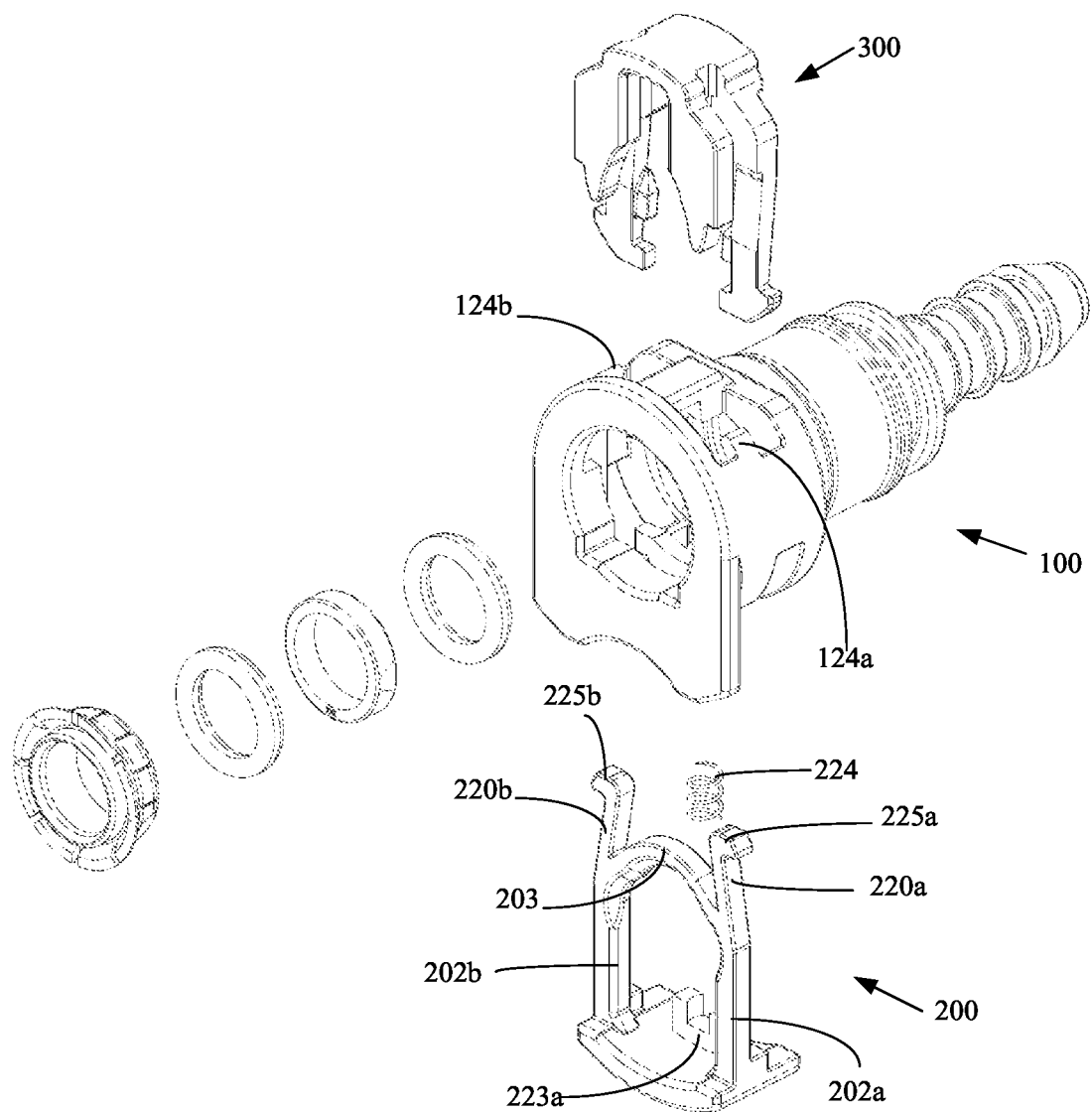
FIG. 13a is an exploded schematic view of the quick connection device in accordance with the fifth preferred embodiment of the disclosure.
Figure 13B:
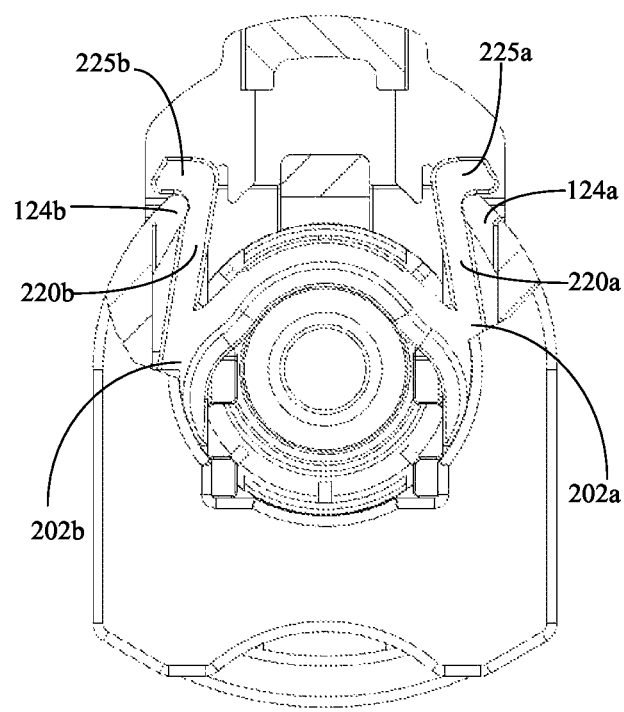
FIG. 13b is a sectional schematic view of the first locking mechanism and the second locking mechanism in the quick connection device as illustrated in FIG. 13a in the initial insertion state, illustrating a pair of positioning arms elastically abutting against the connection housing.
Figure 13C:
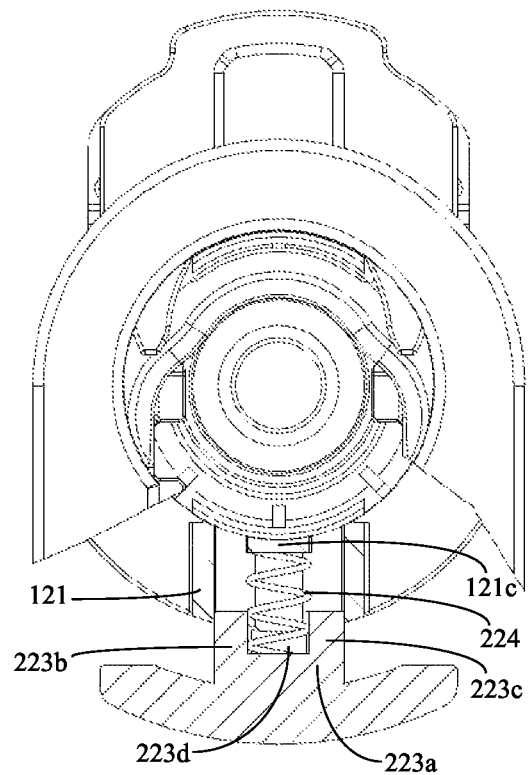
FIG. 13c is a sectional schematic view of the first locking mechanism and the second locking mechanism in the quick connection device as illustrated in FIG. 13a in the initial insertion state, illustrating an auxiliary elastic reset component.

In the fourth embodiment as illustrated in FIG. 12a to FIG. 12c and in the fifth embodiment as illustrated in FIG. 13a to FIG. 13c, an optional variation of the first locking mechanism 200 is shown. For simplicity, the structures similar to the above embodiments of the quick connection device will not be described in detail in the following description.

In the embodiment as illustrated in FIG. 12a to FIG. 12c, the elastic reset component ensuring the first locking mechanism 200 is in the locked position is configured to extend perpendicularly from the pedestal 201 and elastically abut against the connection housing 100. A pair of positioning arms 220a, 220b extends out of the connection housing from the connection strip 203. In some embodiments, the free ends of the pair of positioning arms 220a, 220b are bent respectively to form hooks 225a, 225b so as to engage with the outer wall surface of the connection housing. Correspondingly, as can be seen from FIG. 12a and. 12b, the outer wall surface of the connection housing 100 is formed with ribs 124a, 124b, such that when the first locking mechanism 200 is mounted into the connection housing 100, the hooks 225a, 225b of the positioning arms 220a, 220b can engage with the ribs 124a, 124b, thereby retaining the first locking mechanism 200 in the connection housing 100.

In the embodiment, the elastic reset component is regarded as the primary reset component of the first locking mechanism 200. However, shall not exclude that the positioning arms may also have a certain function of elastic reset.

In combination with FIG. 12a and FIG. 12c, the elastic reset component comprises a column 221a perpendicularly extending from the pedestal 201, plug pieces 221b, 221c adjacent to the column 221a, and an elastic piece 222 fixedly fitting with the column 221a, wherein the elastic piece 222 is fixed at the free end of the column 221a and elastically abutted against the connection housing. For example, in the illustrated embodiment, a positioning protrusion 221d is formed at the free end of the column 221a, and the elastic piece 222 is fixed by the positioning protrusion 221d via a perforation 222b thereon. When the first locking mechanism is moved upward due to insertion of the opposite plug-in tube, the plug pieces 221b, 221c enter into the accommodation groove of the connection housing and contact the side walls 121, and the free ends 222c, 222d of the elastic pieces 222 abut against the protrusions 121a, 121b of the side walls so as to be elastically deformed, thus avoiding shaking of the first locking mechanism in the connection housing by means of the cooperation of the elastic reset component and the accommodation groove and further enhancing the connection reliability of the first locking mechanism. After the opposite plug-in tube is inserted in place, the first locking mechanism would be reset and returned to the locked position due to the elastic piece 222.

In the embodiment as illustrated in FIG. 13a to FIG. 13c, a pair of positioning arms 220a, 220b is configured to extend from the retaining arms 202a, 202b to elastically abut against the connection housing such that the first locking mechanism is retained in the locked position. It can be best seen in FIG. 13b, the positioning arms 220a, 220b are preferably configured to extend obliquely upward from the retaining arms 202a, 202b, such that the distance between the positioning arms at the connection with the retaining arms is greater than the distance between the free ends of the pair of positioning arms. In this way, the positioning arms are configured with certain elasticity per se. Similar to the above embodiment, the free ends of the positioning arms 220a, 220b can be bent respectively to form the hooks 225a, 225b to engage with the outer wall surface of the ribs 124a, 124b of the connection housing, such that when the opposite plug-in tube is inserted, the positioning arms with elasticity press the ribs 124a, 124b of the connection housing, and when the opposite plug-in tube is fully inserted, the first locking mechanism 200 can be retained in the connection housing 100 by means of the elastic reset of the positioning arms.

In the embodiment, the first locking mechanism 200 may further include an auxiliary elastic reset component. In combination with FIG. 13a and FIG. 13c, the auxiliary elastic reset component is configured to comprise a U-shaped pillar extending perpendicularly from the pedestal 201 and a spring 224 fixedly fitting with the U-shaped pillar, wherein the U-shaped pillar comprises a U-shaped bottom 223a and a pair of upright walls 223b, 223c, and a fitting groove 223d is formed between the pair of upright walls 223b, 223c. When the first locking mechanism is moved upward due to insertion of the opposite plug-in tube, the upright walls 223b, 223c enter into the accommodation groove of the connection housing and contact the side walls 121, and the spring 224 is positioned in the fitting groove 223d and elastically abuts against an abutment protrusion 121c on the connection housing. Accordingly, the first locking mechanism is reset return to the locked position due to the positioning arms 220a, 220b and the spring 224 after the opposite plug-in tube is inserted in place.

Although the description in the above embodiment takes spring and elastic piece as examples, it may be understood that the elastic component having an elastic reset function is not limited thereto.

The quick connection device of the disclosure realizes a compact configuration, and the cooperation of the two locking mechanisms ensures quick connection and reliable locking of the opposite plug-in tube. Even if the second locking mechanism is unlocked, the first locking mechanism ensures locking of the opposite plug-in tube. Moreover, it can be determined visually whether the opposite plug-in tube is properly inserted in place. When the second locking mechanism is locked, the second locking mechanism at least supports a portion of the first locking mechanism to ensure a reliable connection. The risk of disengagement of the opposite plug-in tube due to misoperation for unlocking the first locking mechanism will not take place. More advantageously, in the double-checked locking mechanism of the disclosure, the components for locking and retaining the opposite plug-in tube are mated but do not interfere with the components for elastically locking and unlocking. In other words, the opposite plug-in tube does not contact the elastic reset component of the locking mechanism. Therefore, there is no elasticity failure caused by the environment such as high temperature which exists in the prior art, and it is more effective to ensure the reliability of the connection device.

The technical contents and the technical characteristics of the disclosure are disclosed above. However, it may be understood that in the creation concept of the disclosure, a person skilled in the art may make various changes and improvements to the above disclosed concepts, which fall within the scope of the disclosure. The description of the above embodiment is exemplary but not limitative, and the protection scope of the disclosure is determined by the claims.

The invention claimed is:

1. A quick connection device having a double-checked locking mechanism, the quick connection device comprising:
    a connection housing having an opened passage for receiving an opposite plug-in tube and a channel; and
    the double-checked locking mechanism received within the channel of the connection housing, the locking mechanism comprising:
    a first locking mechanism inserted into the connection housing and having a pedestal from which a pair of retaining arms extends perpendicularly, the pair of retaining arms being connected by a connection strip to form an enclosed retaining ring for fitting with the opposite plug-in tube, and further having an elastic reset component for retaining the first locking mechanism in a locked position, wherein the elastic reset component comprises a pair of reset arms that extend from the retaining arms to engage an inner surface of the connection housing;
    a second locking mechanism inserted into the connection housing in a direction opposite to the insertion direction of the first locking mechanism, and having a base from which locking arms and holding arms extend perpendicularly, the first locking mechanism being inserted between the locking arms and the holding arms;
    wherein the locking arms at least support a portion of the first locking mechanism, and the second locking mechanism prevents movement of the first locking mechanism from the locked position to an unlocked position when the second locking mechanism is in a locked position.

2. The quick connection device according to claim 1, wherein the pair of reset arms being a pair of connected arcuate arms between the connection housing and the retaining ring.

3. The quick connection device according to claim 1, wherein the pair of reset arms being a pair of separated arcuate arms between the connection housing and the retaining ring.

4. The quick connection device according to claim 2 or 3, wherein buffer portions are disposed between the arcuate arms and the retaining ring.

5. The quick connection device according to claim 1, wherein the locking arms of the second locking mechanism extend toward an arcuate shaped surface of an inner wall of the connection housing to form an extension portion, so as to support the retaining arms and the retaining ring of the first locking mechanism.

6. The quick connection device according to claim 1, wherein the first locking mechanism further comprises an auxiliary elastic reset component which extends perpendicularly from the pedestal and elastically abuts against the connection housing.

7. The quick connection device according to claim 6, wherein the auxiliary elastic reset component comprises a boss extending perpendicularly from the pedestal and elastic fins obliquely extending from free ends of the boss of the pedestal.

8. The quick connection device according to claim 1, wherein the first locking mechanism comprises a shoulder extending from the pedestal toward free ends of the holding arms of the second locking mechanism, and the free ends abut against the shoulder when the second locking mechanism is in the locked position.

9. The quick connection device according to claim 1, wherein the pair of retaining arms of the first locking mechanism are respectively provided with a stopping rib which is capable of retaining the first locking mechanism in the connection housing.

10. The quick connection device according to claim 1, wherein the retaining ring of the first locking mechanism comprises an arcuate portion mated with an insert part of the opposite plug-in tube.

11. A quick connection device having a double-checked locking mechanism, the quick connection device comprising:
a connection housing having an opened passage for receiving an opposite plug-in tube and a channel and the double-checked locking mechanism received within the channel of the connection housing, the locking mechanism comprising:
a first locking mechanism inserted into the connection housing and having a pedestal from which a pair of retaining arms extends perpendicularly, the pair of retaining arms being connected by a connection strip to form an enclosed retaining ring for fitting with the opposite plug-in tube, and further having an elastic reset component for retaining the first locking mechanism in a locked position, the elastic reset component extending perpendicularly from the pedestal and elastically abutting against the connection housing;
a second locking mechanism inserted into the connection housing in a direction opposite to the insertion direction of the first locking mechanism, and having a base from which locking arms and holding arms extend perpendicularly, the first locking mechanism being inserted between the locking arms and the holding arms;
wherein the locking arms at least support a portion of the first locking mechanism and the second locking mechanism prevents movement of the first locking mechanism from the locked position to an unlocked position when the second locking mechanism is in a locked position;
wherein the first locking mechanism further comprises a pair of positioning arms extending from the retaining arms, the free ends of the positioning arms respectively bending to form a hook to engage the outer wall surface of the connection housing, such that the first locking mechanism is retained in the connection housing.

12. The quick connection device according to claim 11, wherein the elastic reset component comprises a column perpendicularly extending from the pedestal, plug pieces adjacent to the column, and an elastic piece fixedly fitting with the column, further wherein the elastic piece is fixed at the free ends of the column and elastically abutted against the connection housing.

13. The quick connection device according to claim 11, wherein the locking arms of the second locking mechanism are configured to extend toward the arcuate shaped surface of the inner wall of the connection housing to form an extension portion, so as to support retaining arms and the retaining ring of the first locking mechanism.

14. The quick connection device according to claim 11, wherein the first locking mechanism comprises a shoulder extending from the pedestal toward the free ends of the holding arms of the second locking mechanism, and the free ends abut against the shoulder when the second locking mechanism is in the locked position.

15. A quick connection device having a double-checked locking mechanism, the quick connection device, comprising:
a connection housing having an opened passage for receiving an opposite plug-in tube and a channel; and
the double-checked locking mechanism received within the channel of the connection housing, the locking mechanism comprising:
a first locking mechanism inserted into the connection housing and having a pedestal from which a pair of retaining arms extends perpendicularly, the pair of retaining arms being connected by a connection strip to form an enclosed retaining ring for fitting with the opposite plug-in tube, and a pair of positioning arms configured to extend from the retaining arms to elastically abut against the connection housing, so as to retain the first locking mechanism in a locked position;
a second locking mechanism inserted into the connection housing in a direction opposite to the insertion direction of the first locking mechanism, and having a base from which locking arms and holding arms extend perpendicularly, the first locking mechanism being inserted between the locking arms and the holding arms;
wherein the locking arms at least support a portion of the first locking mechanism and the second locking mechanism prevents movement of the first locking mechanism from the locked position to an unlocked position when the second locking mechanism is in a locked position.

16. The quick connection device according to claim 15, wherein the free ends of the pair of positioning arms of the first locking mechanism respectively bend to form a hook to engage the outer wall surface of the connection housing, such that the first locking mechanism is retained in the connection housing.

17. The quick connection device according to claim 15, wherein the first locking mechanism further comprises an auxiliary elastic reset component comprising a U-shaped column perpendicularly extending from the pedestal and a spring fixedly fitting with the U-shaped column, the U-shaped column comprising a pair of upright walls, the spring being positioned in a fitting groove between the upright walls and elastically abutting against the connection housing.

18. The quick connection device according to claim 15, wherein the locking arms of the second locking mechanism extend toward the arcuate shaped surface of the inner wall of the connection housing to form an extension portion, so as to support the retaining arms and the retaining ring of the first locking mechanism.

19. The quick connection device according to claim 15, wherein the first locking mechanism comprises a shoulder extending from the pedestal toward the free ends of the holding arms of the second locking mechanism, and the free ends abut against the shoulder when the second locking mechanism is in the locked position.

\* \* \* \* \*